H. MICHELSEN.
REFRIGERATING SHIPPING CRATE.
APPLICATION FILED NOV. 12, 1919.

1,330,947.

Patented Feb. 17, 1920.
2 SHEETS—SHEET 1.

INVENTOR
Hamilton Michelsen
BY
Caesar Totten
ATTORNEYS

H. MICHELSEN.
REFRIGERATING SHIPPING CRATE.
APPLICATION FILED NOV. 12, 1919.
1,330,947.
Patented Feb. 17, 1920.
2 SHEETS—SHEET 2.
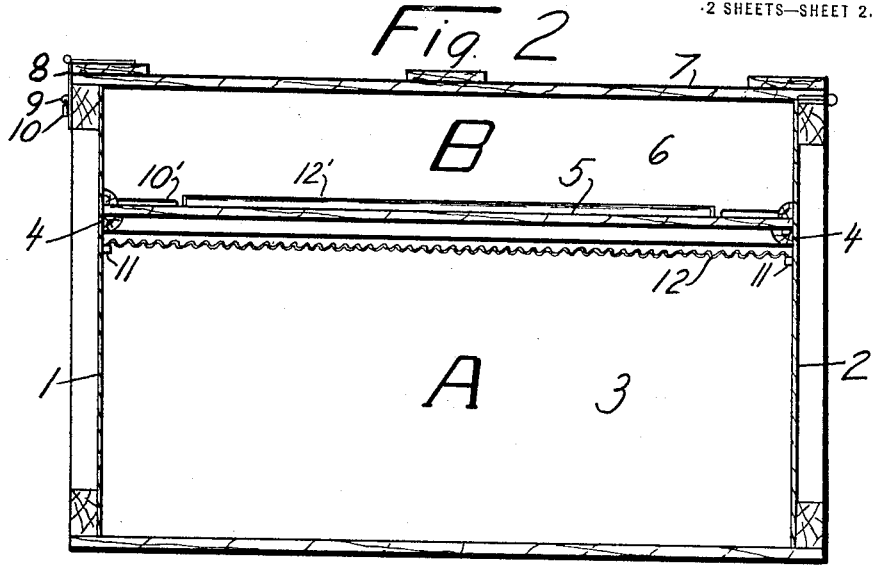
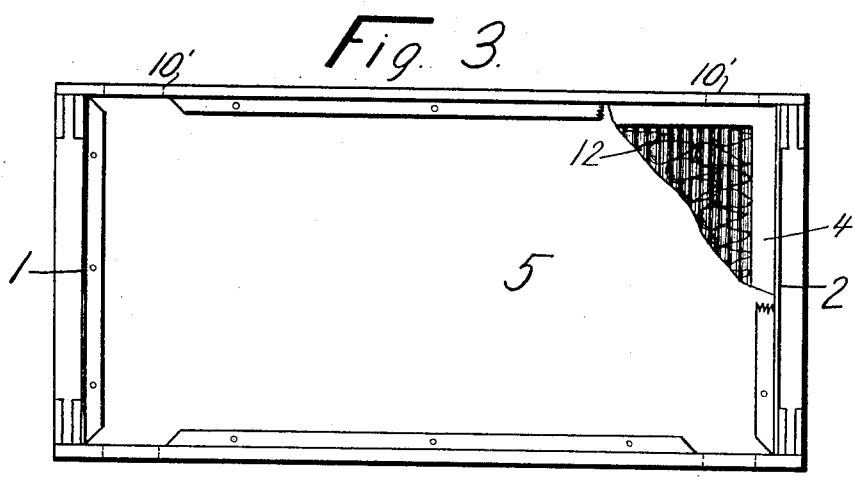
INVENTOR
Hamilton Michelsen
BY
Ackers & Totter
ATTORNEYS

UNITED STATES PATENT OFFICE.

HAMILTON MICHELSEN, OF MIAMI, FLORIDA.

REFRIGERATING SHIPPING-CRATE.

1,330,947.  Specification of Letters Patent.  Patented Feb. 17, 1920.

Application filed November 12, 1919. Serial No. 337,557.

*To all whom it may concern:*

Be it known that I, HAMILTON MICHELSEN, a citizen of the United States, residing at Miami, in the county of Dade and State of Florida, have invented certain new and useful Improvements in Refrigerating Shipping-Crates, of which the following is a specification.

The hereinafter described invention relates to a crate or container for the shipment of fruit generally to distant points, although more particularly designed for use in the transportation or shipment of that class of fruit known as avocadoes.

This fruit is of an exceedingly delicate nature and must be handled with extreme care during shipment to distant points, and in order to enable the fruit to successfully withstand shipment to distant points it is required that the fruit be maintained in a cool condition throughout the entire time of travel or transportation, but, at the same time provision must be made whereby the said fruit is not permitted to become frozen during shipment, for if the foregoing takes place the fruit immediately becomes black and is rendered worthless.

The objects of the invention are, therefore, the provision of a crate adapted for the packing therein of the avocado fruit to be transported, and of such construction as to permit of the re-icing of the crate for the maintenance of the fruit in a cool condition while being transported to distant points; the provision within the crate or box for maintaining the fruit out of contact with the iced surface of the receptacle or crate, thereby preventing the fruit from becoming frozen; the provision not only for preventing the freezing of the fruit, but also in the maintenance of an air circulation between the bottom of the icing chamber and the chamber for the fruit contained within the receptacle or crate, and further, in the providing of a re-icing crate, simple and inexpensive of construction, efficient, durable and capable of withstanding the handling of crates of this kind during transportation when filled with the fruit to be transported, the inexpensiveness of the shipping crate rendering it unnecessary for the receiver of the fruit to return the empty crate or container to the shipper thereof.

In order to comprehend the invention, reference should be had to the accompanying sheet of drawings, wherein, Figure 1 is a perspective view of the shipping crate, partly broken away.

Fig. 2 is a longitudinal sectional view, taken on the line $x$—$x$ Fig. 1 of the drawings.

Fig. 3 is a top plan view of the crate with its cover removed.

Figure 1:
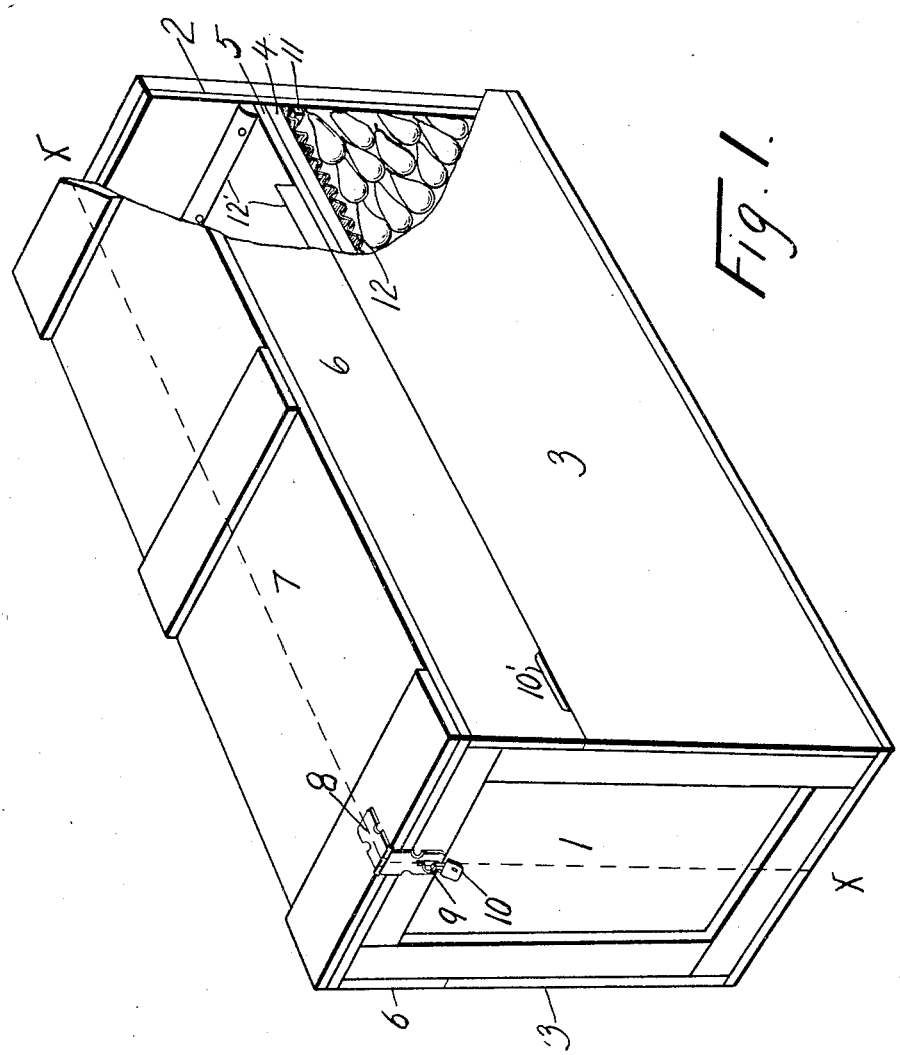

Preferably, the shipping crate or container is a rectangular structure and constructed of wood, and the same is divided interiorly into a lower compartment A for the packing of the fruit therein, and an upper compartment B for the holding of ice for the maintaining of the fruit in a cool condition during transportation.

As illustrated in the drawing, the crate or container proper, is composed of the end walls 1—2, and the side walls 3—3; the end walls 1—2 projecting a distance above the side walls 3—3 of the crate or container to a distance equal to approximately the depth of the icing chamber B. Within the crate or container and at a point substantially flush with the upper edges of the side walls of the box or container, is secured the supporting shelf or ridge 4, the same being composed of longitudinal and transverse strips secured in any suitable manner to the inner walls of the end and side pieces of the said crate or container, and said shelf or support is adapted to hold the partition board 5 interposed between the fruit chamber A and the re-icing chamber B, and which constitutes the bottom of the icing chamber, being positioned within the crate or container after the lower compartment thereof has been filled with the fruit to be transported.

The upper, or the icing chamber B of the shipping crate or container, is formed by the projecting portions of the end walls 1—2 and the side pieces 6—6, which side pieces are of a width or height equal to the depth of the icing chamber to be provided, the said side pieces terminating flush with the top of the end walls 1—2 of the crate or container. To one of the end walls, as for instance the end wall 1, is hinged, or otherwise secured, the cover 7, which at its free end carries the fastening hasp 8, the free end of which is adapted to engage with the staple 9 secured to the upper portion of the end wall 2 and be held thereto by a suitable lock 10. Below the supporting strips for the bottom 5 of the icing chamber is secured to the inner surfaces of the end walls 1—2, the transverse supporting strips 11, which are arranged a slight distance below the supporting strips for the bottom of the icing chamber, and provide supports for the holding of a layer 12 of cellular material, preferably formed of wood-wool. This layer of material is placed over the upper layer of the fruit within the fruit receiving compartment A of the crate or container and separates the same from the bottom of the icing chamber, thereby providing for a free circulation of air and preventing the delicate avocadoes from becoming frozen, which would be the result if exposed to direct contact with the under-surface of the ice-chilled bottom 5 of the refrigerating chamber B.

In order to provide for the escape of water from within the iced chamber or compartment of the shipping crate as the ice therein melts, there are provided weep-holes 10' in each side wall of the icing compartment, which weep-holes in the present case are formed by cutting away a portion of the lower edge surface of each side member or side piece 6 of the icing chamber, at a point adjacent the ends thereof. These weep-openings permit the free escape or outflow of the water formed by the melting of the ice within the refrigerating chamber B of the crate or compartment, and which would quickly fill the said compartment and run into the lower compartment of the crate or container if such weep-openings were not provided.

The crate or container above described is only utilized for the shipment of perishable fruit or such as requires re-icing at given intervals of time, say for instance, at least every fifteen hours during transportation and which is required in the case of shipment for transportation of avocadoes. During transportation when re-icing of the chamber B is required, the lock 10 is released in order that the top cover 7 of the crate or container may be opened for the re-introduction of ice within the icing chamber.

It will be understood, that during the packing of the crate or container for the shipment of fruit, that the bottom of the refrigerating chamber and the layer of non-conducting material are removed from within the container in order that free access may be had to the fruit receiving compartment A of the crate or container for the placing of the fruit therein. When this fruit receiving compartment has been filled with the fruit to be shipped, the layer 12 of non-conducting material is inserted within the crate and held in place by the supports positioned therein for said purpose, said layer resting on the upper surface of the fruit. The bottom 5 of the icing chamber is then inserted to rest on the supports 4 provided therefor, after which, the icing chamber B is filled with ice and the cover 7 locked to the container or crate. The fruit filled and iced crate or container is then in condition for the transportation of the fruit to distant points, and so long as the said crate or container is properly iced throughout the time of shipment there is no danger of spoilation of the fruit contained therein.

This invention has been found to be of the utmost importance for the successful shipment of avocadoes and other delicate fruit from the State of Florida to the Pacific coast and to other distant points, and experience has shown that the fruit so shipped arrives at its point of destination in perfect condition, and by the use thereof the shipper of fruit of the character described is enabled to dispense with the heavy refrigerators or drums heretofore employed for this purpose, the expense of which requires the reshipment of the empty refrigerator or drums to the shipper of the fruit.

Owing to the air circulating medium interposed between the bottom of the icing chamber and the fruit receiving compartment A of the crate or container, there is a circulation of cool air maintained throughout the fruit compartment during the time of travel of the fruit to distant points, which cool air circulating between and throughout the fruit held within the fruit compartment A of the receptacle maintains the same in a cool condition at all times and spoilation is prevented while being transported during hot weather.

The bottom of the refrigerating chamber is held in place within the icing chamber or compartment of the crate or container by means of the longitudinal and transverse strips 12', which are arranged above the bottom and screwed to the side and end walls of the ice-receiving compartment. It is only necessary to unscrew said strips in order to remove the bottom 5 of the icing chamber to gain access to the fruit contained within the fruit holding compartment for the removal thereof from within the crate or container.

While the invention has been illustrated and described in its preferred embodiment, I do not wish to be understood as limiting or restricting myself to the detailed construction of the parts as illustrated and described, but on the contrary desire to be understood as claiming the invention as broadly as the state of the art will permit.

Having thus described the invention what is claimed as new and desired to be protected by Letters Patent is:

1. A refrigerating shipping crate for the transportation of fruit, the same comprising a box receptacle having its interior divided into a fruit receiving compartment and an ice receiving compartment, a removable partition piece separating the said compartments and forming a bottom for the ice-receiving compartment, a layer of cellular material arranged below the said bottom to overlie the fruit within the fruit compartment and maintain the same from contact with the under-surface of the bottom, weep-openings formed in the walls of the ice-compartment for the escape of water therefrom, a cover for the ice compartment, and means for locking the said cover to the crate.

2. A refrigerating shipping crate for the transportation of fruit, the same comprising a box receptacle formed of end and side walls to provide a fruit receiving compartment, the end pieces extended above said compartment to a height approximately the depth of an icing chamber, side pieces secured to said end pieces above the fruit compartment to form an ice receiving compartment, a supporting ledge within the receptacle above the fruit compartment thereof, a removable bottom for the ice-receiving compartment resting on said support for separating the ice-receiving compartment from the fruit receiving compartment, outlets in the walls of the ice-receiving compartment for the escape of water therefrom, a layer of cellular material arranged within the fruit compartment to separate the fruit therein from the under surface of the bottom of the ice-receiving compartment, a cover for said compartment and means for locking said cover to the crate.

3. A shipping crate having its interior divided into a fruit receiving chamber and an ice-receiving chamber, a removable partition separating said chamber and serving as a bottom for the ice-receiving chamber, means for detachably securing said bottom in position, a layer of cellular material arranged below the partition to separate the fruit from contact with the under surface thereof, a cover for the ice-receiving chamber, and means for locking the cover to said crate.

4. A shipping crate having its interior divided into a fruit receiving chamber and an ice receiving chamber, a removable partition separating said chambers and serving as a bottom for the ice-receiving chamber, means for detachably securing said bottom in position, a layer of cellular material arranged below the partition to separate the fruit from contact with the under surface thereof, weep openings in the walls of the ice-receiving chamber for the escape of water from the interior thereof, a cover for the ice-receiving chamber, and means for locking the cover to said crate.

In testimony whereof I have signed my name to this specification in the presence of two subscribing witnesses.

HAMILTON MICHELSEN.

Witnesses:
T. C. HARMS,
J. RENTREATH.